United States Patent
Tsubaki et al.

(10) Patent No.: US 10,431,390 B2
(45) Date of Patent: Oct. 1, 2019

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Yuichiro Tsubaki, Kyoto (JP); Tatsuji Aoyama, Yamaguchi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/702,643

(22) Filed: Sep. 12, 2017

(65) Prior Publication Data

US 2018/0090279 A1 Mar. 29, 2018

(30) Foreign Application Priority Data

Sep. 29, 2016 (JP) ................................. 2016-192091

(51) Int. Cl.
*H01G 9/035* (2006.01)
*H01G 9/00* (2006.01)
*H01G 9/145* (2006.01)

(52) U.S. Cl.
CPC ........... *H01G 9/035* (2013.01); *H01G 9/0029* (2013.01); *H01G 9/145* (2013.01)

(58) Field of Classification Search
CPC ........ H01G 9/028; H01G 9/032; H01G 9/035; H01G 9/038; H01G 9/15; H01G 9/145; H01G 9/2004; H01G 9/2009; H01G 9/2013; H01G 2009/0014; H01G 2009/0025

See application file for complete search history.

(56) References Cited

U.S. PATENT DOCUMENTS

| | | | | |
|---|---|---|---|---|
| 2008/0316679 A1* | 12/2008 | Sugihara | ................ | H01G 9/145 361/504 |
| 2009/0034160 A1* | 2/2009 | Takeda | .................. | H01G 9/145 361/505 |
| 2010/0053847 A1* | 3/2010 | Tani | ...................... | H01G 9/035 361/505 |
| 2014/0022701 A1* | 1/2014 | Machida | .............. | H01G 9/0036 361/524 |
| 2015/0049419 A1* | 2/2015 | Biler | ..................... | H01G 9/025 361/525 |
| 2015/0053882 A1* | 2/2015 | Akazawa | .............. | H01G 9/035 252/62.2 |
| 2016/0020036 A1* | 1/2016 | Murata | .................. | H01G 9/035 361/509 |
| 2016/0336117 A1* | 11/2016 | Koseki | ................ | H01G 9/0036 |
| 2017/0207032 A1* | 7/2017 | Uher | ..................... | H01G 9/012 |

FOREIGN PATENT DOCUMENTS

JP        63-261823        10/1988

* cited by examiner

*Primary Examiner* — Nguyen T Ha
(74) *Attorney, Agent, or Firm* — McDermott Will & Emery LLP (57) ABSTRACT

An electrolytic capacitor includes an anode body having a dielectric layer on a surface of the anode body, a cathode body, and an electrolytic solution interposed between the anode body and the cathode body. The electrolytic solution contains a first ester compound and a second ester compound. The first ester compound is a condensate of boric acid and a sugar alcohol. The second ester compound contains at least one condensate selected from the group consisting of a condensate of boric acid and a monool compound and a condensate of boric acid and a polyol compound excluding a sugar alcohol.

6 Claims, 2 Drawing Sheets

ELECTROLYTIC CAPACITOR AND METHOD FOR MANUFACTURING SAME

BACKGROUND

1. Technical Field

The present disclosure relates to an electrolytic capacitor including an electrolytic solution, and a method for manufacturing the electrolytic capacitor.

2. Description of the Related Art

An electrolytic capacitor includes an anode body having a dielectric layer, a cathode body, and an electrolytic solution interposed between the anode body and the cathode body. The electrolytic solution actually functions as a cathode material. Various studies are performed concerning composition of the electrolytic solution. For example, as a technique for improving a withstand voltage of an electrolytic capacitor, it is known that boric acid and hexitol are added to an electrolytic solution (Unexamined Japanese Patent Publication No. S63-261823).

SUMMARY

An electrolytic capacitor according to a first aspect of the present disclosure includes an anode body having a dielectric layer on a surface of the anode body, a cathode body, and an electrolytic solution interposed between the anode body and the cathode body. The electrolytic solution contains a first ester compound, and a second ester compound. The first ester compound is a condensate of boric acid and a sugar alcohol. The second ester compound contains at least one condensate selected from the group consisting of a condensate of boric acid and a monool compound and a condensate of boric acid and a polyol compound excluding a sugar alcohol.

A second aspect of the present disclosure is a method for manufacturing an electrolytic capacitor including an anode body having a dielectric layer on a surface of the anode body, a cathode body, and an electrolytic solution interposed between the anode body and the cathode body. The method for manufacturing an electrolytic capacitor includes preparing an electrolytic solution containing boric acid, a sugar alcohol, and a second ester compound. The second ester compound contains at least one condensate selected from the group consisting of a condensate of boric acid and a monool compound and a condensate of boric acid and a polyol compound excluding a sugar alcohol.

According to the present disclosure, it is possible to improve a withstand voltage and heat resistance of an electrolytic capacitor.

DETAILED DESCRIPTION OF EMBODIMENT

In the electrolytic capacitor in Unexamined Japanese Patent Publication No. S63-261823, a condensate of the boric acid and the hexitol is formed by a dehydration condensation reactionof boric acid and hexitol which are added to the electrolytic solution. Due to this, a sparking voltage of an electrolytic solution is increased. However, in the electrolytic capacitor including the electrolytic solution to which boric acid and hexitol are added, water produced by the above dehydration condensation reaction is vaporized to increase an internal pressure of the electrolytic capacitor when the electrolytic capacitor is heated at a high-temperature of 100° C. or higher during a reflow treatment. This may deforms a rubber sealing member disposed at an opening of a case, and there may be a possibility of causing a failure such as occurrence of defective mounting.

[Electrolytic Capacitor]

An electrolytic capacitor according to the present disclosure includes an anode body having a dielectric layer, a cathode body, and an electrolytic solution interposed between the anode body and the cathode body. The electrolytic solution contains a solvent and a solute soluble in the solvent. The electrolytic solution contains a first ester compound that is a condensate of boric acid and a sugar alcohol, and a second ester compound. The second ester compound contains at least one condensate selected from the group consisting of a condensate of boric acid and a monool compound and a condensate of boric acid and a polyol compound excluding a sugar alcohol.

The first ester compound is formed by a dehydration condensation reaction between boric acid and a sugar alcohol which are added to the electrolytic solution, and is dissolved as a complex compound in the electrolytic solution. The second ester compound is also present as a complex compound in the electrolytic solution. Since a sparking voltage of the electrolytic solution can be raised by the existence of the first ester compound, withstand voltage of the electrolytic capacitor can be enhanced.

Water that is produced by the above dehydration condensation reaction is decreased by hydrolysis of the second ester compound. Therefore, it is possible to suppress failures due to an increase of an internal pressure of the electrolytic capacitor during a reflow treatment (during a high-temperature treatment) because of the presence of much water. Heat resistance of the electrolytic capacitor can be enhanced.

A content proportion of water in the electrolytic solution can be reduced to 3% by mass or less by containing the second ester compound in the electrolytic solution, even when boric acid and a sugar alcohol, which easily produce relatively much water by the above-mentioned dehydration condensation reaction, are added to the electrolytic solution.

When the first ester compound is a compound obtained by esterification reaction of a sugar alcohol with at least two hydroxyl groups among three hydroxyl groups in a molecule of boric acid, it is possible to suppress a deposition of a part of the boric acid in the electrolytic solution, which is caused by a large amount of boric acid from being produced by hydrolysis of the first ester compound. According to this, it is possible to suppress boric acid (including a deposit) derived from the first ester compound from being excessively present in the electrolytic solution, and the withstand voltage of the electrolytic capacitor can be enhanced.

By containing the second ester compound in the electrolytic solution, the sparking voltage of the electrolytic solution can be raised and the withstand voltage of the electrolytic capacitor can be enhanced. The effect of raising the sparking voltage of the electrolytic solution by the second ester compound can be achieved even when the electrolytic solution does not contain the first ester compound.

When viscosity of the electrolytic solution is increased by the second ester compound, the sparking voltage of the electrolytic solution can be further raised and the withstand voltage of the electrolytic capacitor can be further enhanced.

Further, when the second ester compound is a compound obtained by esterification reaction of a monool compound or a polyol compound with at least two hydroxyl groups among three hydroxyl groups in a molecule of boric acid, it is possible to suppress a deposition of a part of the boric acid in the electrolytic solution, which is caused by a large amount of boric acid from being produced by hydrolysis of the second ester compound. According to this, it possible to suppress boric acid (including a deposit) derived from the second ester compound from being excessively present in the electrolytic solution, and the withstand voltage of the electrolytic capacitor can be enhanced.

It can be confirmed by, for example, liquid chromatography that the electrolytic solution contains the first ester compound and the second ester compound. In this case, the electrolytic solution is extracted from the electrolytic capacitor, and a hydrolysate of at least one of the first ester compound and the second ester compound may be analyzed.

Examples of the sugar alcohol include thritols (glycerol), tetritols (erythritol), pentitols (xylitop, and hexitols (sorbitol, mannitol, dulcitol). Among these, hexitols are preferable, and mannitol is more preferable from the viewpoint of the withstand voltage of the electrolytic capacitor.

The electrolytic solution may contain at least one of a hydrolysate of the first ester compound and a hydrolysate of the second ester compound. The hydrolysate of the second ester compound includes a hydrolysate that is produced by hydrolysis of a part of the second ester compound with water produced in the above dehydration condensation reaction.

The hydrolysate of the first ester compound includes a hydrolysate that is produced by hydrolysis of a part of the first ester compound with water produced in the above dehydration condensation reaction, as well as a part of boric acid and a sugar alcohol which are not contributing to the dehydration condensation reaction among the boric acid and the sugar alcohol which are added to the electrolytic solution.

The second ester compound contains at least one condensate selected from the group consisting of a condensate of boric acid and a monool compound and a condensate of boric acid and a polyol compound excluding a sugar alcohol. The second ester compound is preferably the condensate of boric acid and a polyol compound, and more preferably a condensate of boric acid and a diol compound from the viewpoint of withstand voltage.

The monool compound is preferably polyalkylene glycol monoalkyl ether because the second ester compound can be easily hydrolyzed and can adequately decrease water produced associated with formation of the first ester compound (complex compound). When the second ester compound is a condensate of boric acid and polyalkylene glycol monoalkyl ether, viscosity of the electrolytic solution can be increased, and therefore the sparking voltage of the electrolytic solution can be further raised. Thus, the withstand voltage of the electrolytic capacitor can be further enhanced.

Examples of the polyalkylene glycol monoalkyl ether include compounds represented by a general formula: $H(OC_2H_4)_nOC_mH_{2m+1}$ (wherein, m is an integer of from 1 to 500, and n is an integer of from 2 to 20). Specific examples of the polyalkylene glycol monoalkyl ether include triethylene glycol monomethyl ether, tetraethylene glycol monoethyl ether, and the like.

The diol compound is preferably polyalkylene glycol because the second ester compound is easily hydrolyzed and can adequately decrease water produced associated with the formation of the first ester compound. When the second ester compound is a condensate of boric acid and polyalkylene glycol, the viscosity of the electrolytic solution can be increased, and therefore the sparking voltage of the electrolytic solution can he further raised. Thus, the withstand voltage of the electrolytic capacitor can be further enhanced.

Examples of the polyalkylene glycol include compounds represented by a general formula: $H(OC_2H_4)_nOH$ (wherein n is an integer of from 2 to 500). Specific examples of the polyalkylene glycol include diethylene glycol, triethylene glycol, and the like.

As the solute (main solute) in the electrolytic solution, a publicly known material may be used, and for example, a salt containing a quaternary imidazolium cation and a carboxylic acid anion, and the like can be used. Specific examples of such a salt include 1,2,3,4-tetramethyl imidazolynium phthalate, 1-ethyl-2,3-dimethyl imidazolynium phthalate, and the like.

A content proportion of the solute in the electrolytic solution ranges, for example, from 10% by mass to 20% by mass, inclusive.

As the solvent in the electrolytic solution, a publicly known material may be used, and for example, a sulfone compound, a lactone compound, a carbonate compound, a glycol compound, and the like can be used. As the sulfone compound, sulfolane, dimethyl sulfoxide, diethyl sulfoxide, and the like can be used. As the lactone compound, γ-butyrolactone, γ-valerolactone, and the like can be used. As the carbonate compound, dimethyl carbonate (DMC), diethyl carbonate (DEC), ethyl methyl carbonate (EMC), ethylene carbonate (EC), propylene carbonate (PC), fluoroethylene carbonate (FEC), and the like can be used. As the glycol compound, ethylene glycol, diethylene glycol, and the like can be used. These compounds may be used alone or in combination of a plurality of compounds. From the viewpoint of ionic conductivity and heat resistance, particularly, the solvent may be preferably sulfolane or γ-butyrolactone.

A content proportion of the solvent in the electrolytic solution ranges, for example, from 60% by mass to 70% by mass, inclusive.

The electrolytic solution may further contain other components in a small amount. Examples of the other components include phosphoric acid esters such as ethyl phosphate and dibutyl phosphate; and nitro compounds such as p-nitrobenzoic acid and p-nitrophenol. A content proportion of the other components in the electrolytic solution ranges, for example, from. 0.1% by mass to 0.5% by mass, inclusive. The phosphoric acid ester is used for the purpose of protecting the anode body from water. The nitro compound is used for the purpose of absorbing hydrogen gas generated on a cathode side.

The electrolytic capacitor may further include a solid electrolyte layer that contains manganese oxide, a conductive polymer, or the like and that covers at least a part of a surface of the dielectric layer.

The conductive polymer is preferably, for example, polypyrrole, polythiophene, or polyaniline. These conductive polymers may be used alone or in combination of two or more conductive polymers, or may be a copolymer of two or more monomers.

In the present specification, polypyrrole, polythiophene, polyaniline, and the like mean polymers having, as a basic skeleton, pyrrole, thiophene, aniline, and the like, respectively. Therefore, polypyrrole, polythiophene, polyaniline, and the like also include derivatives of polypyrrole, polythiophene, polyaniline, and the like, respectively. For example, polythiophene includes poly(3,4-ethylenedioxythiophene) (PEDOT) and the like.

The solid electrolyte layer may be formed by chemical polymerization or electrolytic polymerization using a solution containing, for example, a monomer, a dopant, and an oxidant. Further, the solid electrolyte layer may be formed by a polymer dispersion containing a liquid component and a conductive polymer dispersed in the liquid component (particularly, a polymer dispersion containing a conductive polymer and a polymer dopant).

A concentration of the conductive polymer contained in the polymer dispersion preferably ranges from 0.5% by mass to 10% by mass, inclusive. An average particle diameter D50 of the conductive polymer preferably ranges from 0.01 μm to 0.5 μm, inclusive, for example. Here, the average particle diameter D50 is a median diameter in a volume particle size distribution obtained by a particle size distribution measuring apparatus according to dynamic light scattering. The polymer dispersion having such a concentration is suitable for forming a solid electrolyte layer that has an appropriate thickness.

Hereinafter, the present disclosure is more specifically described with reference to an exemplary embodiment. The exemplary embodiment described below, however, is not to limit the present disclosure.

Figure 1:
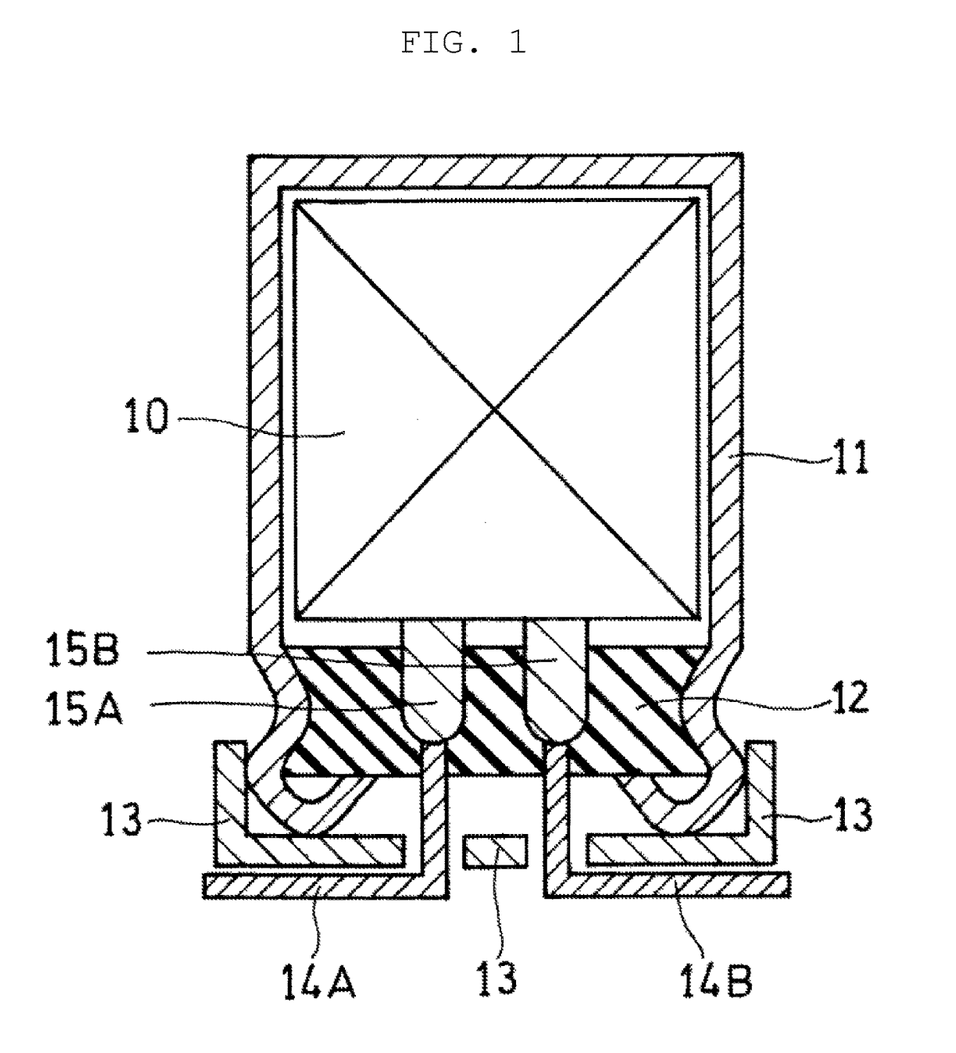
FIG. 1 is a schematic sectional view illustrating an electrolytic capacitor according to one exemplary embodiment of the present disclosure.
Figure 2:
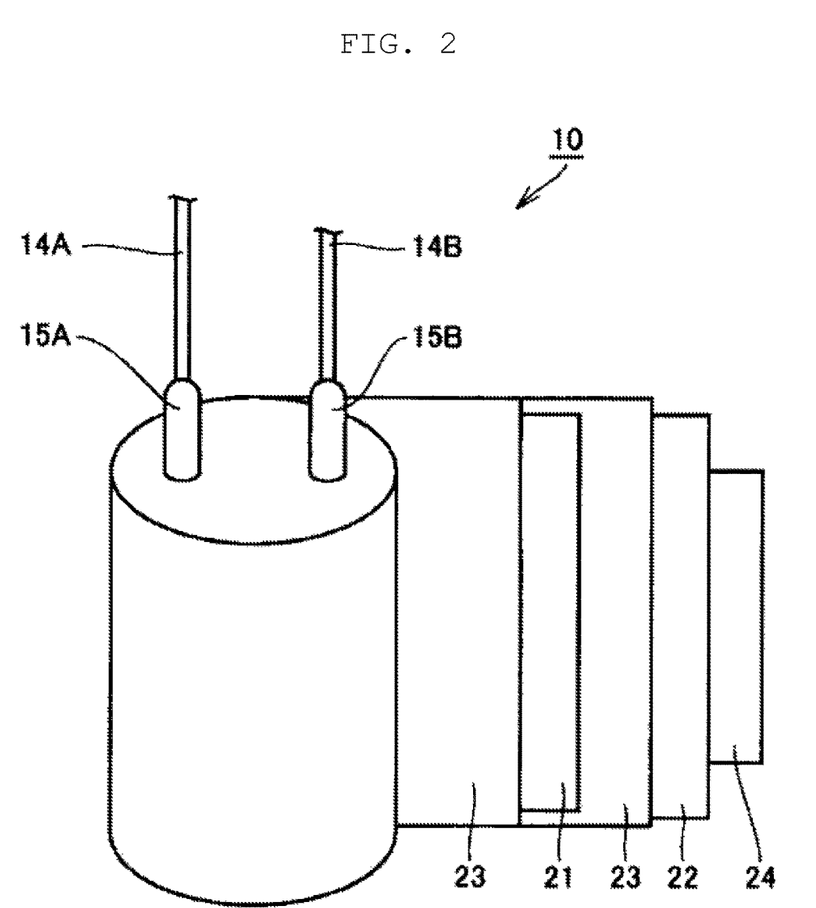
FIG. 2 is a schematic view illustrating a configuration of a capacitor element according to the exemplary embodiment.

FIG. 1 is a schematic sectional view illustrating the electrolytic capacitor according to the present exemplary embodiment, and FIG. 2 is a schematic view obtained by developing a part of a capacitor element of the electrolytic capacitor.

The electrolytic capacitor includes, for example, capacitor element 10, bottomed case 11 that houses capacitor element 10, sealing member 12 that seals an opening of bottomed case 11, base plate 13 that covers sealing member 12, lead wires 14A, 14B that are lead out from sealing member 12 and penetrate base plate 13, lead tabs 15A, 15B that connect the lead wires 14A, 14B to electrodes of capacitor element 10, respectively, and an electrolytic solution (not shown). Bottomed case 11 is, at a part near an opening end, processed inward by drawing. Further, bottomed case 11 is, at the opening end, curled for swaging to sealing member 12.

Sealing member 12 is formed of an elastic material containing a rubber component. As the rubber component, butyl rubber (IIR), nitrile rubber (NBR), ethylene propylene rubber, ethylene propylene diene rubber (EPDM), chloroprene rubber (CR), isoprene rubber (IR), Hypalon (trademark) rubber, silicone rubber, fluorine-containing rubber, and the like can be used. Sealing member 12 may contain fillers such as carbon black and silica.

Capacitor element 10 is formed of a wound body as illustrated in FIG. 2. The wound body includes anode body 21 connected to lead tab 15A, cathode body 22 connected to lead tab 15B, and separator 23.

Anode body 21 and cathode body 22 are wound with separator 23 interposed between the anode body and the cathode body. An outermost periphery of the wound body is fixed with fastening tape 24. FIG. 2 shows partially developed wound body before the outermost periphery of the wound body is fixed. Anode body 21 includes a metal foil whose surface is roughened so as to have projections and recesses, and the dielectric layer is formed on the metal foil having the projections and recesses.

Capacitor element 10 may further include a solid electrolyte layer. The conductive polymer is attached to at least a part of a surface of the dielectric layer to form the solid electrolyte layer. The solid electrolyte layer may cover at least a part of a surface of cathode body 22 or at least a part of a surface of separator 23. The solid electrolyte layer may also cover both of at least a part of a surface of cathode body 22 and at least a part of a surface of separator 23. Capacitor element 10 is housed in an outer case (bottomed case 11) together with the electrolyte solution.

Since the electrolytic solution to be used for the electrolytic capacitor according to the present exemplary embodiment contains the first ester compound and the second ester compound, an electrolytic capacitor having an excellent property in withstand voltage and heat resistance can be obtained.

Since the sparking voltage of the electrolytic solution can be raised by the first ester compound formed by a dehydration condensation reaction between, in a part, boric acid and a sugar alcohol which are added to the electrolytic solution, the withstand voltage of the electrolytic capacitor can be enhanced. Water that is produced by the dehydration condensation reaction can be decreased by hydrolysis of the second ester compound. Therefore, it is possible to suppress an increase of an internal pressure of the electrolytic capacitor caused by the above-mentioned vaporization of water during a reflow treatment (during a high-temperature treatment). Thus the heat resistance of the electrolytic capacitor can be enhanced.

[Method for Manufacturing Electrolytic Capacitor]

The method for manufacturing an electrolytic capacitor according to the present disclosure includes a step of preparing an electrolytic solution containing, as additives, boric acid, a sugar alcohol, and a second ester compound. The second ester compound contains at least one condensate selected from the group consisting of a condensate of boric acid and a monool compound and a condensate of boric acid and a polyol compound excluding a sugar alcohol. In the step of preparing an electrolytic solution (step of dissolving a solute in a solvent), the above-mentioned additives may further be added.

Boric acid and a sugar alcohol which are added to the electrolytic solution are subjected to a dehydration condensation reaction to form a condensate of the boric acid and the sugar alcohol (first ester compound), and the condensate is dissolved as a complex compound. Since the first ester compound is soluble as a complex compound, deposition of the boric acid in the electrolytic solution can be reduced. The second ester compound is also present as a complex compound in the electrolytic solution. Since a sparking voltage of the electrolytic solution can be raised by the presence of the first ester compound, withstand voltage of the electrolytic capacitor can be enhanced.

Since water that is produced by the above dehydration condensation reaction is used for hydrolysis of the second ester compound, the water is decreased. Therefore, it is possible to suppress an increase of an internal pressure of the electrolytic capacitor during a reflow treatment (during a high-temperature treatment) that caused by the presence of much water. Thus, heat resistance of the electrolytic capacitor can be enhanced.

Hereinafter, described are steps of one exemplary method for manufacturing the electrolytic capacitor according to the present exemplary embodiment.

(i) Step of Preparing Anode Body 21 Having Dielectric Layer

First, a metal foil as a raw material for anode body 21 is prepared. A type of the metal is not particularly limited, but it is preferred to use a valve metal such as aluminum, tantalum, or niobium, or an alloy including a valve metal, from the viewpoint of facilitating formation of the dielectric layer.

Next, a surface of the metal foil is roughened. By the roughening, a plurality of projections and recesses are formed on the surface of the metal foil. The roughening is preferably performed by etching the metal foil. The etching may be performed by, for example, a direct-current electrolytic method or an alternating-current electrolytic method.

Next, a dielectric layer is formed on the roughened surface of the metal foil. A method for forming the dielectric layer is not particularly limited, and the dielectric layer can be formed by subjecting the metal foil to an anodizing treatment. The anodizing treatment is performed by, for example, immersing the metal foil in an anodizing solution such as an ammonium adipate solution followed by a heat treatment. The anodizing treatment may also be performed by applying a voltage to the metal foil that has been immersed in the anodizing solution.

Normally, a large foil of, for example, a valve metal (metal foil) is subjected to the roughening treatment and the anodizing treatment from the viewpoint of mass productivity. In this case, the treated foil is cut into a desired size to prepare anode body 21.

(ii) Step of Preparing Cathode Body 22

A metal foil can also be used for cathode body 22 as with the anode body. A type of the metal is not particularly limited, but it is preferred to use a valve metal such as aluminum, tantalum, or niobium, or an alloy including a valve metal. A surface of cathode body 22 may be roughened as necessary.

(iii) Production of Wound Body (Capacitor Element 10)

Next, anode body 21 and cathode body 22 are used to produce a wound body.

First, anode body 21 and cathode body 22 are wound with separator 23 interposed between the anode body and the cathode body. At this time, the winding can be conducted while lead tabs 15A, 15B are rolled in the anode body, the cathode body, and the separator, to cause lead tabs 15A, 15B to stand up from the wound body as illustrated in FIG. 2.

As a material for separator 23, a nonwoven fabric can be used that includes, as a main component, for example, synthetic cellulose, polyethylene terephthalate, a vinylon, or an aramid fiber.

A material for lead tabs 15A, 15B is not also particularly limited as long as the material is a conductive material. A material for lead wires 14A, 14B connected to lead tabs 15A, 15B, respectively, is not also particularly limited as long as the material is a conductive material.

Next, fastening tape 24 is disposed on an outer surface of cathode body 22 positioned at an outermost layer of wound anode body 21, cathode body 22, and separator 23, to fix an end of cathode body 22 with fastening tape 24. When anode body 21 is prepared by cutting a large metal foil, the wound body may further be subjected to an anodizing treatment in order to provide a dielectric layer on a cutting surface of anode body 21.

(iv) Step of Preparing Electrolytic Solution

In the present step, a solute is added to a solvent, and further boric acid, a sugar alcohol and a second ester compound are added as additives to prepare an electrolytic solution. For the second ester compound, at least one condensate selected from the group consisting of a condensate of boric acid and a monool compound and a condensate of boric acid and a polyol compound excluding a sugar alcohol is used. For the solvent and the solute, publicly known materials as exemplified above may be used. A content proportion of the solvent in the electrolytic solution ranges, for example, from 60% by mass to 70% by mass, inclusive.

It is preferred that an addition ratio of a sum of the boric acid and the sugar alcohol to the whole electrolytic solution ranges from 2% by mass to 20% by mass, inclusive, and an addition ratio of the second ester compound to the whole electrolytic solution ranges from 2% by mass to 60% by mass, inclusive. The addition ratio (% by mass) referred to herein refers to a ratio by mass of additives (boric acid, sugar alcohol and second ester compound) to a mass of the whole electrolytic solution containing the additives.

When the addition ratio of the sum of the boric acid and the sugar alcohol to the whole electrolytic solution is 2% by mass or more, it is possible to adequately achieve an effect of raising a sparking voltage by formation of the first ester compound. When the addition ratio of the sum of the boric acid and the sugar alcohol to the whole electrolytic solution is 20% by mass or less, the electrolytic solution has a moderate viscosity, and a decline of ionic conductivity of the electrolytic solution can be suppressed. In order to increase the ionic conductivity of the electrolytic solution, the addition ratio of the sum of the boric acid and the sugar alcohol more preferably ranges from 2% by mass to 10% by mass, inclusive.

When the addition ratio of the second ester compound to the whole electrolytic solution is 2% by mass or more, it is possible to adequately achieve an effect of decreasing water by hydrolysis of the second ester compound. When the addition ratio of the second ester compound to the whole electrolytic solution is 60% by mass or less, the electrolytic solution has a moderate viscosity, and a decline of ionic conductivity of the electrolytic solution can be suppressed. In order to suppress the decline of the ionic conductivity of the electrolytic solution, the addition ratio of the second ester compound more preferably ranges from 2% by mass to 50% by mass, inclusive, and still more preferably ranges from 2% by mass to 10% by mass, inclusive.

It is more preferred that the addition ratio of the sum of the boric acid and the sugar alcohol to the whole electrolytic solution ranges from 2% by mass to 10% by mass, inclusive, and the addition ratio of the second ester compound to the whole electrolytic solution ranges from 2% by mass to 10% by mass, inclusive. In this case, it is possible to adequately achieve the effect of raising a sparking voltage by formation of the first ester compound and the effect of decreasing water by hydrolysis of the second ester compound, and the decline of ionic conductivity of the electrolytic solution can be adequately suppressed.

When the addition ratio of the sum of the boric acid and the sugar alcohol to the whole electrolytic solution ranges from 2% by mass to 10% by mass, inclusive, and the addition ratio of the second ester compound to the whole electrolytic solution ranges from 2% by mass to 50% by mass, inclusive, the addition ratio of the second ester compound to be added to the whole electrolytic solution is preferably five-eighths or more of the addition ratio of the SUM of the boric acid and the sugar alcohol to be added to the whole electrolytic solution. In this case, it is possible to further enhance the effect of raising a sparking voltage by formation of the first ester compound and the effect of decreasing water by hydrolysis of the second ester compound.

An addition ratio of a sum of the boric acid and the second ester compound preferably ranges from 100 parts by mass to 1600 parts by mass, inclusive, with respect to 100 parts by mass of the sugar alcohol. When the addition ratio of the sum of the boric acid and the second ester compound is 100 parts by mass or more with respect to 100 parts by mass of the sugar alcohol, it is possible to achieve, in a balanced manner, an effect of raising a sparking voltage by formation of the first ester compound and an effect of decreasing water by hydrolysis of the second ester compound. When the addition ratio of the sum of the boric acid and the second ester compound is 1600 parts by mass or less per 100 parts by mass of the sugar alcohol, the electrolytic solution has a moderate viscosity, and ionic conductivity of the electrolytic solution can be further enhanced.

An addition ratio of the second ester compound preferably ranges from 100 parts by mass to 2400 parts by mass, inclusive, with respect to 100 parts by mass of the boric acid. When the addition ratio of the second ester compound is 100 parts by mass or more per 100 parts by mass of the boric acid, it is possible to adequately achieve the effect of decreasing water by hydrolysis of the second ester compound. When the addition ratio of the second ester compound is 2400 parts by mass or less per 100 parts by mass of the boric acid, the electrolytic solution has a moderate viscosity, and the ionic conductivity of the electrolytic solution can be further enhanced.

(v) Step of Impregnating Capacitor Element 10 with Electrolytic Solution

Next, capacitor element 10 is impregnated with an electrolytic solution. According to this, an electrolytic capacitor having an excellent property in a repairing function of a dielectric layer can be obtained. A method for impregnating capacitor element 10 with an electrolytic solution is not particularly limited. For example, a method of immersing capacitor element 10 in the electrolytic solution housed in a container is simple and preferred. An immersion period depends on a size of capacitor element 10, and ranges, for example, from 1 second to 5 minutes, inclusive. Impregnation is preferably performed under a reduced pressure in an atmosphere ranging, for example, from 10 kPa to 100 kPa, inclusive, preferably from 40 kPa to 100 kPa, inclusive.

(iv) Step of Encapsulating Capacitor Element 10

Next, capacitor element 10 is encapsulated. Specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or alloys of these metals.

Next, sealing member 12 formed so as to allow lead wires 14A, 14B to penetrate the sealing member is disposed above capacitor element 10 to encapsulate capacitor element 10 in bottomed case 11. Next, bottomed case 11 is, at a part near an opening end, processed by transverse drawing and is, at the opening end, curled for swaging sealing member 12. Then, base plate 13 is disposed on a curled part of the bottomed case 11 to complete the electrolytic capacitor as illustrated in FIG. 1. Subsequently, an aging treatment may be performed while a rated voltage is applied.

When the solid electrolyte layer is formed on at least a part of a surface of the dielectric layer, a film containing the conductive polymer that covers at least a part of the dielectric layer may be formed after the above step (iii) and before the above step (v).

In the exemplary embodiment described above, a wound electrolytic capacitor has been described. The application range of the present disclosure, however, is not limited to the wound electrolytic capacitor and can also be applied to other electrolytic capacitors such as a laminated electrolytic capacitor. The laminated electrolytic capacitor includes a capacitor element obtained by laminating, for example, a plate-like anode body and a plate-like cathode body with a separator interposed therebetween.

EXAMPLES

Hereinafter, the present disclosure will be described in more detail with reference to examples; however, the present disclosure is not limited to the examples.

Examples 1 to 24

In the present example, a wound electrolytic capacitor (Φ (diameter): 8.0 mm×L (length): 12.0 mm) having a rated voltage of 100 V and a rated electrostatic capacity of 15 µF was produced. Hereinafter, a specific method for manufacturing the electrolytic capacitor is described.

(Preparation of Anode Body)

A 100-µm-thick aluminum foil was subjected to etching to roughen a surface of the aluminum foil. Then, a dielectric layer was formed on the surface of the aluminum foil by an anodizing treatment. The anodizing treatment was performed by immersing the aluminum foil in an ammonium adipate solution and applying a voltage of 60 V to the aluminum foil. Then, the aluminum foil was cut into a size of 6 mm (length)×120 mm (width) to prepare an anode body.

(Preparation of Cathode Body)

A 50-µm-thick aluminum foil was subjected to etching to roughen a surface of the aluminum foil. Then, the aluminum foil was cut into a size of 6 mm (length)×120 mm (width) to prepare a cathode body.

(Production of Wound Body (Capacitor Element))

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body, and the separator. Ends of the lead tabs protruding from the wound body were connected to an anode lead wire and a cathode lead wire, respectively. Then, the produced wound body was subjected to an anodizing treatment again to form a dielectric layer at a cutting end of the anode body. Next, an end of an outer surface of the wound body was fixed with a fastening tape to produce a wound body.

(Preparation of Electrolytic Solution)

Tetramethyl imidazolynium phthalate as a main solute is added to a solvent, and further boric acid, a sugar alcohol and a second ester compound are added to the solvent to prepare an electrolytic solution. Sulfolane and γ-butyrolactone (mass ratio, sulfolane:γ-butyrolactone=20:80) were used for the solvent of the electrolytic solution. Mannitol was used for the sugar alcohol. For the second ester compound, a condensate of boric acid and a monool compound, and a condensate of boric acid and a diol compound were used. A molar ratio between the monool compound and the diol compound was set to 1:1. Triethylene glycol Monomethyl ether was used for the monool compound and diethylene glycol was used for the diol compound.

An addition ratio of tetramethyl imidazolynium phthalate to the whole electrolytic solution was set to 15% by mass. Addition ratios of the boric acid, the mannitol and the second ester compound to the whole electrolytic solution were set to values shown in Table 1 and Table 2. An amount of the solvent in the electrolytic solution was adjusted so that the addition ratio of tetramethyl imidazolynium phthalate to the whole electrolytic solution is the above-mentioned value and that the addition ratios of the boric acid, the mannitol and the second ester compound to the whole electrolytic solution are values shown in Table 1 and Table 2.

(Impregnation of Electrolytic Solution)

The capacitor element was immersed in an electrolytic solution for 5 minutes in an atmosphere of a reduced pressure (40 kPa). In this way, the capacitor element was impregnated with the electrolytic solution.

(Encapsulation of Capacitor Element)

The capacitor element that had been impregnated with the electrolytic solution was encapsulated to complete an electrolytic capacitor. Specifically, the capacitor element was housed in a bottomed case so that lead wires are positioned on an opening side of the bottomed case, and a sealing member (an elastic material including butyl rubber as a rubber component) that was formed so as to allow the lead wires to penetrate the sealing member was disposed above the capacitor element, to encapsulate the capacitor element in the bottomed case. The bottomed case was, at a part near an opening end, processed by drawing and was further curled at the opening end, and a base plate was disposed on a curled part to complete the electrolytic capacitor as illustrated in FIG. 1. Then, an aging treatment was performed at 130° C. for 2 hours while a rated voltage was applied.

Comparative Example 1

An electrolytic capacitor was produced in the same manner as in Example 2 except for not adding the second ester compound to the electrolytic solution.

Comparative Example 2

An electrolytic capacitor was produced in the same manner as in Example 2 except for not adding the boric acid and the mannitol to the electrolytic solution.

Comparative Example 3

An electrolytic capacitor was produced in the same manner as in Example 1 except for not adding the boric acid, the mannitol and the second ester compound to the electrolytic solution.

Each of the electrolytic capacitors of Examples and Comparative Examples as produced above, and each of the electrolytic solutions used in production of electrolytic capacitors were evaluated as follows.

[Evaluation]
(1) Measurement of Sparking Voltage of Electrolytic Solution

An aluminum foil for high-pressure (area: 10 cm$^2$) subjected to an etching treatment and an anodizing treatment was used for an anode, and an aluminum foil (area: 10 cm$^2$) having a flat surface was used for a cathode. Using a constant current method, a constant current of 2 mA was applied to the electrolytic capacitor at 25° C., and a sparking voltage of the electrolytic solution was measured.

(2) Measurement of Occurrence Rate of Swelling in Electrolytic Capacitor (Evaluation of Heat Resistance)

One hundred electrolytic capacitors were prepared for each of Examples and Comparative Examples. The electrolytic capacitor was left standing for 5 minutes in a state of being heated at 200° C. During the heating, an electrolytic capacitor in which the sealing member was deformed was visually checked to determine a number of such electrolytic capacitors, and a ratio of the number of such electrolytic capacitors to the whole number of electrolytic capacitors was taken as an occurrence rate of swelling.

Table 1 and Table 2 show results of the evaluation.

TABLE 1

| | Addition Ratio to Whole Electrolytic Solution (% by mass) | | | | Sparking Voltage (V) | Occurrence Rate of Swelling (%) |
|---|---|---|---|---|---|---|
| | Boric Acid | Mannitol | Total Ratio of Boric Acid and Mannitol | Second Ester Compound | | |
| Example 1 | 1.5 | 2 | 3.5 | 5 | 109 | 0 |
| Example 2 | 3 | 4 | 7 | 5 | 128 | 0 |
| Example 3 | 3 | 5 | 8 | 5 | 134 | 0 |
| Example 4 | 3 | 7 | 10 | 5 | 148 | 5 |
| Example 5 | 3 | 10 | 13 | 5 | 153 | 6 |
| Example 6 | 5 | 5 | 10 | 5 | 155 | 10 |
| Example 7 | 7 | 2 | 9 | 5 | 142 | 8 |
| Comparative Example 1 | 3 | 4 | 7 | — | 115 | 85 |
| Comparative Example 2 | — | — | — | 5 | 95 | 0 |
| Comparative Example 3 | — | — | — | — | 80 | 0 |

TABLE 2

| | Addition Ratio to Whole Electrolytic Solution (% by mass) | | | | Sparking Voltage (V) | Occurrence Rate of Swelling (%) |
|---|---|---|---|---|---|---|
| | Boric Acid | Mannitol | Total Ratio of Boric Acid and Mannitol | Second Ester Compound | | |
| Example 8 | 1 | 1 | 2 | 2 | 97 | 0 |
| Example 9 | 1 | 1 | 2 | 5 | 100 | 0 |
| Example 10 | 1 | 1 | 2 | 10 | 119 | 0 |
| Example 11 | 1 | 1 | 2 | 25 | 127 | 0 |
| Example 12 | 1 | 1 | 2 | 50 | 135 | 0 |
| Example 13 | 1 | 1 | 2 | 60 | 144 | 0 |
| Example 2 | 3 | 4 | 7 | 5 | 128 | 0 |
| Example 14 | 3 | 4 | 7 | 10 | 137 | 0 |
| Example 15 | 3 | 4 | 7 | 25 | 155 | 0 |
| Example 16 | 3 | 4 | 7 | 50 | 166 | 0 |
| Example 17 | 3 | 4 | 7 | 60 | 172 | 0 |
| Example 6 | 5 | 5 | 10 | 5 | 155 | 10 |
| Example 18 | 5 | 5 | 10 | 10 | 143 | 0 |
| Example 19 | 5 | 5 | 10 | 25 | 163 | 0 |
| Example 20 | 5 | 5 | 10 | 50 | 175 | 0 |
| Example 21 | 5 | 5 | 10 | 60 | 180 | 0 |
| Example 22 | 7 | 13 | 20 | 25 | 171 | 8 |

TABLE 2-continued

| | Addition Ratio to Whole Electrolytic Solution (% by mass) | | | | Sparking Voltage (V) | Occurrence Rate of Swelling (%) |
|---|---|---|---|---|---|---|
| | Boric Acid | Mannitol | Total Ratio of Boric Acid and Mannitol | Second Ester Compound | | |
| Example 23 | 7 | 13 | 20 | 50 | 182 | 0 |
| Example 24 | 7 | 13 | 20 | 60 | 189 | 0 |

In Examples 1 to 24, the sparking voltage was increased to improve the withstand voltage, and the occurrence rate of swelling was significantly reduced to attain excellent heat resistance.

When Example 2 was compared with Comparative Example 1 in which the addition ratio of the boric acid and the addition ratio of the mannitol were the same as those in Example 2, not only the heat resistance was significantly improved, but also the sparking voltage was further raised to further improve the withstand voltage in Example 2 by further adding the second ester compound, as compared with Comparative Example 1.

In Comparative Example 1 in which the boric acid and the mannitol were added, the withstand voltage was improved, but the occurrence rate of swelling was increased to significantly deteriorate the heat resistance since the second ester compound was not added.

In Comparative Example 2, since the boric acid and the mannitol were not added, the first ester compound was not formed, and the sparking voltage was lowered to deteriorate the withstand voltage.

In Comparative Example 3, the sparking voltage became lower than the sparking voltages of Comparative Examples 1 and 2.

Examples 25 to 27

Electrolytic capacitors were produced and evaluated in the same manner as in Example 2 except for using, as the second ester compound, a condensate of the boric acid and a monool compound or a condensate of the boric acid and a diol compound, or a condensate of the boric acid, a monool compound and a diol compound as shown in Table 3 in the preparation of the electrolytic solution. In addition, a ratio by mole between two types of the monool compounds in Example 25, a ratio by mole between two types of the diol compounds in Example 26, and a ratio by mole between the monool compound and the diol compound in Example 27 were set to 1:1, respectively. Table 3 shows results of the evaluation.

TABLE 3

| | Monool Compound | Diol Compound | Sparking Voltage (V) | Occurrence Rate of Swelling (%) |
|---|---|---|---|---|
| Example 25 | Triethylene glycol monomethyl ether Tetraethylene glycol monoethyl ether | — | 126 | 0 |
| Example 26 | — | Diethylene glycol Triethylene glycol | 185 | 0 |
| Example 27 | Triethylene glycol monoethyl ether | Triethylene glycol | 130 | 0 |

As shown in Table 3, a higher sparking voltage was obtained in the order of Example 26, Example 27, and Example 25. In Example 26, a condensate of two types of the diol compounds and the boric acid was used. In Example 27, a condensate of the monool compound and the boric acid, and a condensate of the diol compound and the boric acid were used. In Example 25, a condensate of two types of the monool compounds and the boric acid was used. It was verified that the diol compound is more effective for an improvement of withstand voltage than the monool compound.

Examples 28 to 32

Electrolytic capacitors were produced and evaluated in the same manner as in Example 2 except for using sugar alcohols shown in Table 4 in the preparation of the electrolytic solution. Table 4 shows results of the evaluation.

TABLE 4

| | Sugar Alcohol | Sparking Voltage (V) | Occurrence Rate of Swelling (%) |
|---|---|---|---|
| Example 2 | Mannitol | 128 | 0 |
| Example 28 | Sorbitol | 125 | 0 |
| Example 29 | Dulcitol | 125 | 0 |
| Example 30 | Erythritol | 123 | 0 |
| Example 31 | Xylitol | 123 | 0 |
| Example 32 | Glycerol | 120 | 0 |

As shown in Table 4, in Examples 2, 28, 29 in which hexitols such as mannitol, sorbitol and dulcitol were used for the sugar alcohol, the sparking voltage is improved more than Examples 30, 31, 32 in which erythritol, xylitol, and glycerin were used for the sugar alcohol. Particularly, Example 2 in which mannitol was used among the hexitols exhibited a high sparking voltage.

Examples 33 to 36

Electrolytic capacitors were produced and evaluated in the same manner as in Example 2 except for using boric acid, mannitol, and second ester compound shown in Table 5 in the preparation of the electrolytic solution.

For the electrolytic capacitors of Example 2 and Examples 33 to 36, ESR (Equivalent Series Resistance) at low temperature (−40° C.) were evaluated. Specifically, a high temperature load test (applying a rated voltage during 1250 hours under an environment of temperature 135° C.) was applied to the electrolytic capacitors, and then the ESR value of each of the electrolytic capacitors in an environment of temperature −40° C. was measured. Then, an ESR ratio (ESR value after the high temperature load test/initial ESR value), which is the ratio of ESR value after the high temperature load test to initial ESR value, was calculated for the each of the electrolytic capacitors. Here, the ESR value at a frequency of 100 kHz was measured for each of the electrolytic capacitors with an LCR meter for 4-terminal measurement. Table 5 shows results of the evaluation.

TABLE 5

| | Addition Ratio to Whole Electrolytic Solution (% by mass) | | | | Occurrence | |
|---|---|---|---|---|---|---|
| | Boric Acid | Mannitol | Total Ratio of Boric Acid and Mannitol | Second Ester Compound | Sparking Voltage (V) | Rate of Swelling (%) | ESR ratio at −40° C. of temperature |
| Example 2 | 3 | 4 | 7 | 5 | 128 | 0 | 6 or more and less than 7 |
| Example 33 | 1 | 4.5 | 5.5 | 5 | 130 | 0 | 3 or more and less than 4 |
| Example 34 | 1 | 5 | 6 | 5 | 135 | 0 | 3 or more and less than 4 |
| Example 35 | 1.5 | 5 | 6.5 | 5 | 139 | 0 | 4 or more and less than 5 |
| Example 36 | 2 | 4.9 | 6.9 | 5 | 144 | 0 | 5 or more and less than 6 |

As shown in Table 5, it can be seen that increases in ESR at low temperature (−40° C.) for the electrolytic capacitors of Examples 33 to 36, each of which contains 2% by mass or less of boric acid, were suppressed. Thus, an addition ratio of the boric acid to a whole electrolytic solution is preferable more than 0% by mass and 2% by mass or less from the viewpoint of suppressing an increase in ESR at low temperature. Further, an addition ratio of the boric acid to a whole electrolytic solution is more preferable from 1% by mass and 2% by mass, inclusive.

The present disclosure can be utilized for an electrolytic capacitor including an electrolytic solution.

What is claimed is:

1. An electrolytic capacitor comprising:
   an anode body having a dielectric layer on a surface of the anode body;
   a cathode body; and
   an electrolytic solution interposed between the anode body and the cathode body,
   wherein:
   the electrolytic solution contains a first ester compound and a second ester compound, the first ester compound being a condensate of boric acid and a sugar alcohol, and
   the second ester compound contains at least one condensate selected from the group consisting of a condensate of boric acid and a monool compound and a condensate of boric acid and a polyol compound excluding a sugar alcohol.

2. The electrolytic capacitor according to claim 1, wherein the sugar alcohol for forming the first ester compound is mannitol.

3. The electrolytic capacitor according to claim 1, wherein the monool compound is polyalkylene glycol monoalkyl ether.

4. The electrolytic capacitor according to claim 1, wherein the polyol compound is polyalkylene glycol.

5. The electrolytic capacitor according to claim 1, wherein the electrolytic solution contains at least one hydrolysate selected from the group consisting of a hydrolysate of the first ester compound and a hydrolysate of the second ester compound.

6. The electrolytic capacitor according to claim 1, wherein a content proportion of water in the electrolytic solution is 3% by mass or less.

* * * * *